Feb. 6, 1951 N. C. PRICE 2,540,456
POWER BOOST UNIT FOR PROPELLER SHAFTS
Filed Oct. 29, 1948 3 Sheets-Sheet 1

INVENTOR
Nathan C. Price

Patented Feb. 6, 1951

2,540,456

UNITED STATES PATENT OFFICE 2,540,456

POWER BOOST UNIT FOR PROPELLER SHAFTS

Nathan C. Price, St. Helena, Calif., assignor to The Sirius Corporation, San Francisco, Calif.

Application October 29, 1948, Serial No. 57,211

14 Claims. (Cl. 290—2)

The present invention relates to power producing apparatus called upon to deliver exceptionally large overload or emergency power generally for relatively short periods of time, to a propeller shaft. This power is intended to complement the power normally delivered to the shaft by an auxiliary engine designed for high efficiency and capable of producing only a relatively low power for cruising at long range.

The present invention also relates to high temperature turbines in general and particularly to marine booster engines of the turbine type, in which the stationary and rotating parts of the turbine are cooled by means of water or other liquids which have suitable cooling characteristics, there being an abundance of cooling capacity in marine installations.

While the invention has manifold applications, its most important application is in the construction of booster-turbines which are designed to operate safely at maximum attainable temperature, achieved by the burning of a stoichiometric mixture of fuel and air, or from any source of heat operating at a high temperature level. A suitable power boost unit must be capable of producing maximum power immediately after being started from cold, without damage, since it must be available for instantaneous emergency operation in certain installations, for example, in patrol boats. Even in the presence of the aforestated high temperatures and rapid changes of load, the constructions of the invention make possible the utilization of materials or metals of a very ordinary type, avoiding the requirement of relatively scarce metals for alloying in the turbine parts.

The power boost unit of this invention is suitable for addition of overload or emergency power capacity in already existing marine installations because of the particular shape which lends itself to compact installation along the propeller shaft in the generally congested area of any boat. The ratio of diameter to length of the power boost unit of this invention is generally about one tenth including the gear reduction and auxiliary components thereof, and the external diameter of a six hundred horsepower unit is approximately six inches.

Furthermore, the air consumption of the subject unit is very much lower than that of usual marine power plants, considering the amount of power produced, reducing the problem which is particularly troublesome in larger vessels of providing sufficient area for combustion air supply and exhaust gas disposal. The unit can be operated using various types of fuels, including the customary marine bunker oil, since the heated working parts are maintained at a sufficient low temperature, in accordance with the constructions provided, that corrosive tendency arising from sulphurous or saline content will affect these parts only at a very slow rate.

In the past, problems involved in the construction of liquid cooled gas-turbines have also included the difficulty of simultaneously providing ease of assembly, ease of cleaning coolant passages, security against coolant leakage, and proper distribution of coolant behind the surfaces exposed to heat, which have prevented the use of liquid cooled gas turbines, even though the potential thermodynamic advantages of operation at high working fluid temperature are common knowledge.

It is accordingly an object of this invention to provide a turbine boost unit construction which overcomes the problems commonly associated with operation at maximum temperature.

It is an object of the invention to provide a construction for liquid cooled gas turbines, which is convenient to service, inexpensive in cost, and yet highly effective in prevention of structural damage due to excessive thermal gradients, particularly those occurring due to rapid change of load.

It is a further objective of the invention to provide a power boost unit which permits proper distribution of forced cooling passages, without undue obstruction of the flow of the working fluid.

It is another object of the invention to reduce the size and required number of parts of a power boost unit to a minimum and to generally facilitate ease of inspection and replacement of parts.

Another objective is to permit a generally concentric distribution of components of the power boost unit within the main casing to produce a unit which is symmetrical and of very small diameter, for ease of installation in congested vehicles. Thus the power boost unit may be easily mounted between frame members of a truck, in the propeller shaft tunnel of a boat, or in the thin wing of an airplane.

It is an object of the invention to combine the features of the power boost unit casings which compensate for differential thermal expansion, with the feature for straining the inducted air of foreign particles, so arranged to prevent clogging of the compressor inlet with ice under conditions of air expansion resulting from high velocity inflow.

It is a still further objective of the invention to provide such auxiliaries as are required, together with structure for clutching and declutching, integral with the power boost unit, to meet the general operational requirements of a power boost unit in the most effective manner.

It is a further objective to provide apparatus to accomplish the foregoing with a maximum dependability and minimum weight.

These and other objects and features of novelty will become evident hereinafter in the description, which, together with the following drawings illustrate preferred embodiments of the invention.

Referring now to the drawings in which like reference numerals refer to corresponding parts throughout the several figures, the apparatus of the invention is as follows.

Figures 1, 2, 3, 4:
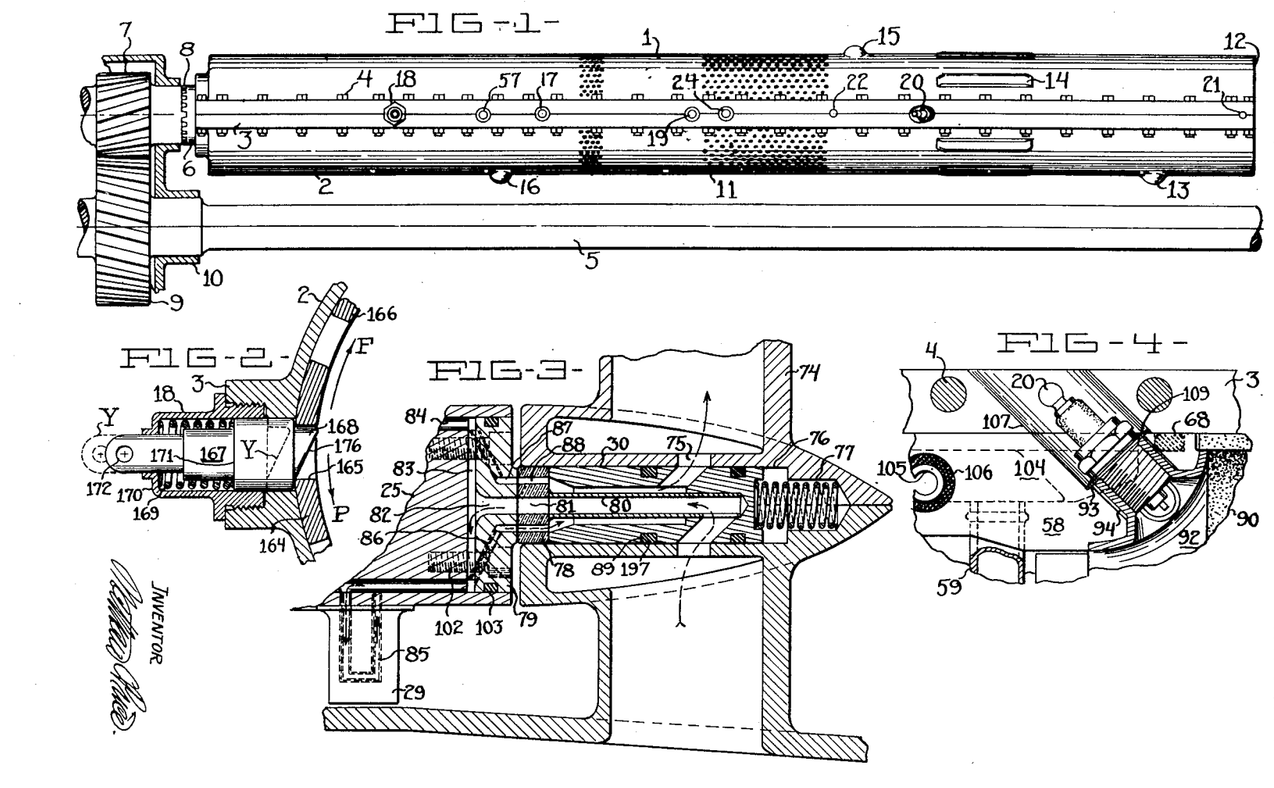
Figure 1 is an external side view of the power boost unit of the invention, installed in conjunction with a propeller shaft located therebeneath.
Figure 2 is a vertical fragmentary section of the clutching control for the reduction gearing, viewed normal to the axis and in a forward direction.
Figure 3 is a vertical fragmentary section along the axis of the power boost unit, showing details of construction of liquid cooling passages for the turbine portion thereof.
Figure 4 is a horizontal fragmentary section taken along the parting plane of the casings of the power boost unit, showing details of the juncture between the air compressor, ignition plug, and combustion chamber thereof.

The power boost unit 1 shown in Figure 1 includes a very long and generally tubular main casing 2 composed of symmetrical upper and lower halves each provided with horizontal parting flanges 3 which are locked together by rows of bolts 4 to locate the internal components with systematic compensation for normal expansion, thereby embodying a unit which can be installed in close parallel relationship to a propeller shaft 5. A drive shaft 6 extends from the front end of the unit, to engage a spur pinion 7 through a face spline 8. The pinion 7 drives a spur gear 9 of the propeller shaft 5 journalled within a reduction gear housing 10. A large number of small perforations 11 penetrate the central portion of the casing wall to admit air free from foreign particles for support of combustion. The exhaust 12 for discharge of the gases of combustion is located at the rear or open end of the casing 2, shown also in Figures 6 and 10. Several bosses are provided in the casing wall 2 for fluid connections to external supplies including a cooling water inlet 13, cooling water transfer tubes 14, a cooling water outlet 15, and a lubricating oil outlet 16.

Other external connections, which are an integral part of internal components of the unit 1, are secured in cylindrical recesses between the flanges 3, and these include: lubricating oil inlets 17 and 57, a clutch control 18, a field coil terminal 19, and a terminal 24 for the brushes of an electrical motor-generator, and an electrical ignition plug 20.

The above mentioned arrangement of connections permits all the internal components of the unit to be lifted out of the lower half of casing 2 and separated, without use of tools, in a few minutes' time for rapid inspection and servicing after removing the bolts 4 and the upper half of the casing 2.

Figure 5:
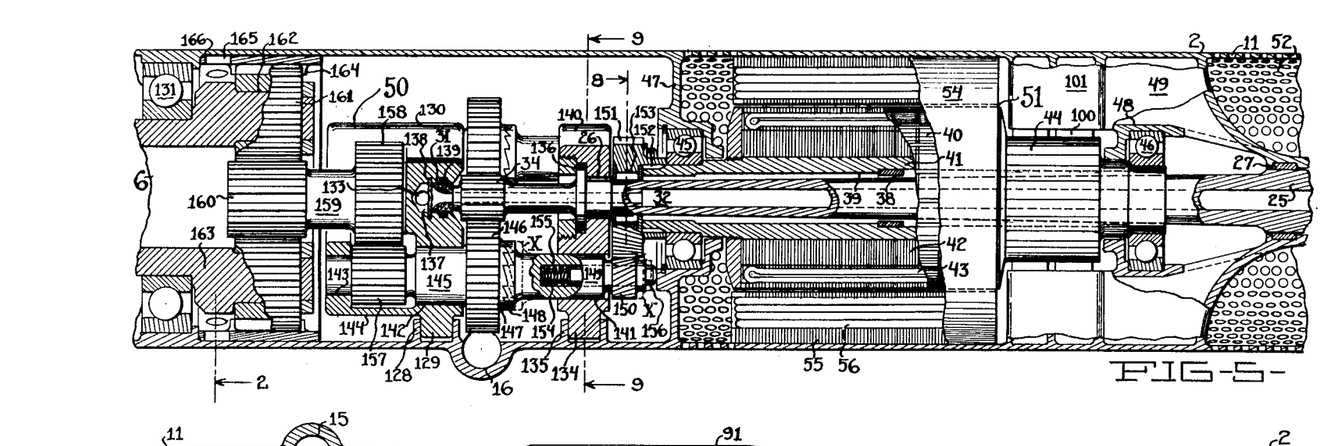
Figure 5 is a vertical fragmentary section along the axis, of the front portion of the power boost unit, showing electrical generation and controllable gear reduction components thereof.
Figure 6:
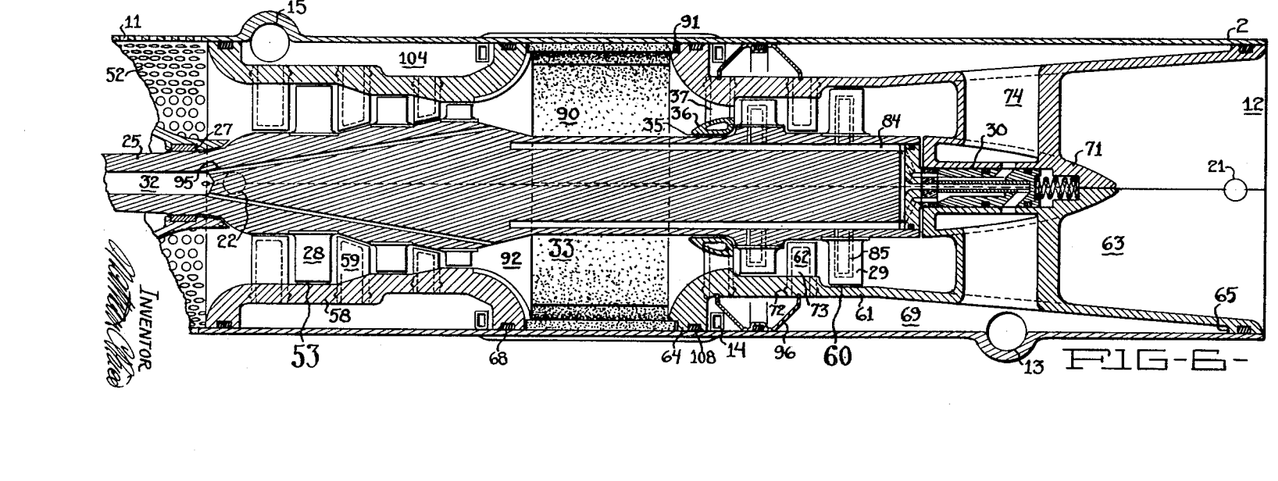
Figure 6 is a vertical section along the axis, of the rear portion of the power boost unit, showing the air compressor, combustion chamber, and turbine components thereof.

Figures 5 and 6 show the interior construction of the power boost unit 1, consisting of a series of coaxial and tandem components located and secured by clamping action of the halves of the casing 2. Starting at the front of the unit 1; components in the order of location are: the drive shaft 6, a planetary gear system 50 for turbine speed reduction and for starting power engagement, an air induction chamber 52 containing an electric motor-generator 51 including a stator assembly 54 of field iron 55 and field conductors 56. The air from the chamber 52 enters an axial flow compressor 53 including a compressor stator casing 58 furnished with stator blading 59. The compressor discharges the air into an open annular combustion space 33. The resultant gases of combustion are subsequently expanded in an axial flow turbine 60 including a turbine stator casing 61 furnished with blading 62. The turbine exhaust gases are finally diffused to low velocity in a conical diffuser 63.

A compressor-turbine rotor 25 extends along the axis of the casing 2 and through the above mentioned components, being supported and aligned by a front bearing 26 and by a central bearing 27, the portion of the rotor between bearings 26 and 27 forming a relatively slender shaft of low flexural rigidity.

The bearings 26 and 27 are preferably either sleeve or Kingsbury type provided with a radial clearance of about two-thousandths of an inch. The portion of the rotor overhung aft of the central bearing 27 comprises a long and generally cylindrical body furnished with air compressor blading 28 preferably of the supersonic airfoil type, at a conoidally enlarged region directly behind the bearing 27. The rearmost portion of the rotor 25 is furnished rows of turbine buckets 29. The rear face of the rotor 25 is contacted along its axis by an injector-cylinder 30 for circulation of cooling water through the rotor 25. The front end of the rotor 25 is contacted along its axis by a seal member 31 for injection of fuel into an axial bore 32 of the rotor. A spur pinion 34 is mounted on the rotor 25 just behind the front end thereof, for transmitting power to the planetary gearset 50. The portion of the rotor 25 extending between the compressor blading 28 and the turbine buckets 29 is surrounded by the combustion space 33.

The compressor-turbine rotor 25 possesses a very low critical speed since it combines a relatively large overhung mass connected to a relatively flexible portion. The critical speed of the rotor is therefore, lower than the minimum idling speed of the power boost unit. While passing over the critical speed range, the rotor is restrained at two places, the first being a bumper bearing surface 35 provided by an inner rim 36 of a turbine nozzle ring 37 located at the entrance to the buckets 29; and the second restraint being a damper bushing 38 in the bore 39 of a rotor 40 of the motor generator 51, through which the rotor 25 projects.

The rotor 40 includes in a representative case, a central shaft 41 surrounded by armature iron 42 and electrical conductors 43, and a plurality of commutator bars 44. The front end of the shaft 41 is journalled in a ball bearing 45 and the rear, or commutator end, in a ball bearing 46. The ball bearing 45 is secured by a transverse bulkhead 47 of the casing 2 while the bearing 46 is held in the larger and front end of a conoidal housing 48 and supported by webs 49 extending radially inward from the casing 2. The apex end of the housing 48 carries the central bearing 27 of the rotor 25. The bushing 38 is preferably spaced radially away from the rotor 25 by approximately fifteen-thousandths of an inch, to form an effective damper of the slender portion of the shaft, by a thick oil film existing in the space, in order not to bring the critical speed within the operating range.

The bumper bearing surface 35 is also spaced approximately fifteen-thousandths of an inch from the surface of the rotor 25, this value being slightly less than the clearance of the tips of the turbine buckets 29 from the bore of the casing 61. Therefore, at speeds higher than the critical, the space between the bumper bearing and the rotor 25 remains open, with the rotor revolving on a metacenter, varying at the most a very few thousandths of an inch from the geometric center.

Guides 101 in the forward portion of the webs 49 support brushes 100 of the motor-generator 51. Since the motor-generator is located opposite the region of the numerous perforations 11 in the casing 2 it is swept by the current of incoming air to the compressor 53 adequately cooling the electrical parts. Conversely, the radiant heat from the electrical components of the motor-generator serves the purpose of preventing formation of ice at the region of the compressor air entrance.

The perforations 11 also serve the purpose of lowering the rigidity of the casing 2 in a diametral direction so that diametral differential expansion between the reduction gear, electrical generator, and compressor-turbine regions of the casing is compensated without overstressing the bolts 4, thereby also preventing the casing from assuming an oval cross section which would cause blading to rub at the tips.

Figure 7:
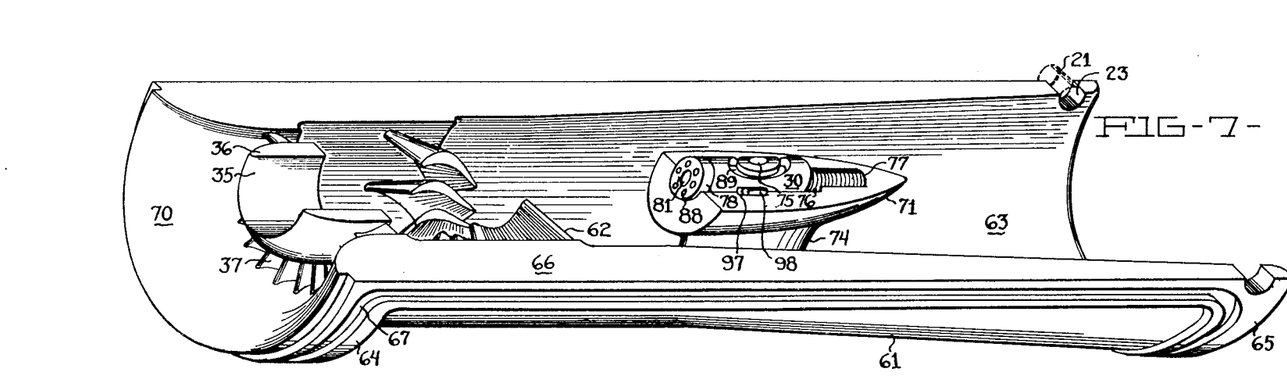
Figure 7 is a perspective view of an inner turbine casing of the power boost unit.

The turbine stator casing 61 is composed of symmetrical upper and lower halves forcibly clamped together by the casing 2, as illustrated in Figures 6 and 7. Likewise, the compressor stator casing 58 is composed of similarly supported halves as shown in Figures 4 and 6. The turbine casing 61 is composed of spool-shaped Duraluminum castings provided with frontal rims 64 and rear rims 65 joined by lengthwise flanges 66 adjacent to the parting line of the casing 2. A continuous groove 67 of rectangular cross section, is furnished in the cylindrical faces of the rims 64 and 65 and of the flanges 66, aforesaid faces contacting the bore of the casing 2. The groove 67 receives a continuous silicon-rubber or "Silicone" ring 108, having circular cross section before being compressed, to form a pair of semiannular cavities 69, which are watertight, between the turbine casing 61 and the casing 2. Crosspins 21 extend from pockets 23 at the rear end of the casing 61 into recesses between the flanges 3 to provide axial and circumferential alignment of the casing 61, with freedom of differential expansion of each half independent of the other. A similar purpose is served by the pins 22 shown in Figures 1 and 6 for locating the compressor casing 58, and the latter is made water-tight by a silicon-rubber ring 68.

The bore of the casing 61 is furnished with a bell-mouthed entrance 70 at the upstream end and with a conoidal diffuser 63 at the downstream end. The stator blading 62 in between is preferably composed of hollow precision castings or of sheet metal formed into hollow blades cast into the casing 61 with transverse surface ridges 72 to insure as-cast tightness in the Duraluminum. The hollows 73 of the blading open into the cavity 69 whereas the tips of the blading are all closed with the exception of the blading of the nozzle ring 37, the hollows of which communicate also with the hollow of the rim 36. Inasmuch as the hollow of the rim 36 is provided with cooling water circulating through the blading 62 from the cavity 69, the rim receives proper cooling, both with respect to combustion heat and with regard to heat of friction developed at the bumper bearing surface 35 during the starting cycle. The bearing surface 35 of the rim 36 is preferably coated with a thin layer of electroplated silver, to prevent scuffing the surface of the rotor 25.

Figure 10:
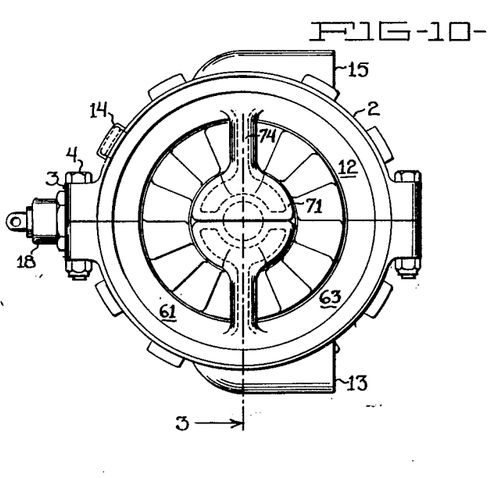
Figure 10 is an external rear, or exhaust end view of the power boost unit.

Referring now to Figures 6, 7, and 10, a conoidal hollow body 71 composed of symmetrical upper and lower halves, is furnished adjacent to the rear end of the rotor 25 and along the axis of the diffuser 63, to diffuse the exhaust flow, being integral castings with streamlined radial struts 74 extending inward from the casing 61. The body 71 and the hollow struts 74 communicate with the cavity 69 to form channels of water circulation leading through upper and lower orifices 75 to the interior of a hollow injector cylinder 30 which is reciprocably contained with a loose fit in a jacketed cylinder bore 76 defined by the halves of the body 71.

Furnished in the surface of the cylinder are annular grooves 89 surrounding the orifices 75 which receive silicon-rubber sealing rings 107. The injector cylinder 30 is prevented from revolving by a cylindrical key 98 extending along a slot 97 formed in the side of the cylinder 30 and in the horizontal joint of the body 71. A compression spring 77 in the bore 76 behind the cylinder 30 urges a hard nose 78 at the front end of the cylinder, against a cover plate 79 secured to the recessed rear end of the rotor 25 by cap screws 102, made liquid tight therewith by a silicon-rubber seal 103. The nose 78 is silver soldered to the wall of the cylinder 30 and to the free end of a tube 80 coaxially contained within the cylinder 30 to define two coaxial flow passages separately communicating with the upper and lower orifices 75. As shown by the arrows drawn in Figure 5, an axial orifice 81 of the nose 78 receives water from the bore of the tube 80 and delivers the water to an axial hole 82 in the cover plate 79 from which circulation occurs centrifugally along radial grooves 83 thereof. One alternate set of a circular row of drilled holes 84 in the rotor 25, extending axially forward directly beneath each bucket 29 to a point opposite the front portion of the combustion space 33 are connected to the grooves 83 and lead the water into the front leg of U-shaped channels 85 within the buckets 29 and out the rear leg to the other alternate set of drilled holes 84. The water from there is returned through oblique passages 86 to an annular recess 87 in the plate 79, surrounding the hole 82 and covered by the nose 78. A circular row of holes 88 extends rearwardly from the recess 87 through the nose 78 to the space around the tube 80.

A strong circulation of water is induced by centrifugal force in the described flow system, leading water from the hollow of the lower strut 74 through the water passages of the rotor 25 and into the hollow of the upper strut 74. The circulation is partially caused by the holes 88 being located at a distance from the axis, while the orifice 81 is at the axis of rotation. Positive pumping action also results from the lessened density of the water as it becomes heated causing the hydraulic head in the grooves 83 to exceed that of the passages 86, as well as differential heads in the legs of the channels 85.

The high rubbing speed of the plate 79 against the nose 78 in the presence of a coolant such as water, which possesses inferior lubricating properties, requires a highly polished, hard and non-corrosive surface under adequate contact pressure to prevent leakage. Synthetic sapphire which is a fused oxide of aluminum has been found to be preferable for the nose 78 since it is a commercially available substance possessing Mohs' hardness of 9. Its properties also include freedom from corrosion, a melting point of 3632 degrees Fahrenheit, and low friction characteristics against the metal of the plate 79.

The injector cylinder 30 is supported in a manner which permits the nose 78 to follow the surface of the plate 79, compensating for differential expansion or deflections of the rotor and casings and following the high frequency angular motion of very small amplitude bound to exist at the plate 79, without being affected by lateral movement of the rotor 25 in performing the sealing action.

The overhung construction of the rotor 25 eliminates the problem of an oil lubricated bearing for rotor support at the heated discharge end of the turbine, and permits the front and rear ends of the rotor to be utilized for injection of fuel and turbine cooling liquid respectively. The presence of the fuel in the forward portion of the rotor produces not only cooling effect, but also a vibration damping and self-balancing effect to properly center the rotor at normal running speeds, and to suppress the intensity of oscillation of the rotor while passing over the critical speed. Furthermore, the described rotor construction eliminates the necessity of providing a separate fuel pump inasmuch as the centrifugal action of the rotor supplies the fuel to the combustion chamber under adequate pressure.

Referring to Figures 4 and 6 the construction of the combustion space 33 is shown. A plurality of curved refractory plates 90 preferably of carborundum forms a cylindrical lining in the bore of the casing 2. The plates 90 are loosely fitted to permit differential expansion of adjoining parts and are retained against the casing 2 by a circumferential shoulder 91 of the casing 61 and by the peripheral edges of a conoidal plate 92 composed of vertically separated halves, lining the air diffuser portion of casing 58. The plate 92 is held in springing contact with the casing 58 by the ignition plugs 20, on either side, which bear upon springs 109 of the ring type, resting on shoulders 93 of the casings 58, the aforesaid plugs being threaded into tubular projections 94 of the plate 92. A vertical vent 105 surrounded by a silicon-rubber ring seal 106, at the parting joint of the longitudinal flanges, connects the upper and the lower portions of the cavity 104 defined by the casings 2 and 58 for the circulation of water.

The method of supporting and sealing the compressor and turbine casings, combustion chamber lining, and ignition plugs permits thermal expansion differentially between upper and lower portions of these parts with respect to the casing 2.

Referring to Figures 5 and 6, fuel admitted to the axial bore 32 of the compressor-turbine rotor passes in rearward direction along the rotor axis to a point opposite the front end of the compressor casing 58 where the flow is divided into a circular row of small drilled holes 95 extending diagonally rearward to the surface of the rotor 25 and beyond the blading 28, where the fuel is delivered by its centrifugal force and at high tangential velocity across the discharge air stream from the blading 28 thereby atomizing most of the fuel in the diffusing air. The unatomized portion of the fuel impinges upon the heated plates 92 and is deflected in fine droplets by the curved surface of these plates into the combustion space 33.

The carborundum plates 90 cause an intense catalytic effect assisting the combustion process. The tangential component of the air discharged from the blading 28 and of the fuel discharged from the holes 95 causes a strong vortex in the combustion chamber, assisting combustion, and this vortex is further accentuated by the windage of the rotor 25.

Referring to Figures 1, 6, and 10, the water transfer tubes 14 are preferably welded or silver soldered to the casings 2 in order to conduct heat effectively from the casings 2 lined by the carborundum plates 90. Water entering the cavity 69 from the inlet 13 of the casing 61 cools the rotor 25 as previously described. The water is also deflected by an annular baffle 96 of V-shaped cross section surrounding the casing 61 to flow with forced circulation in the hollows of the stator blading 62 and of the nozzle ring 37.

This water then enters the transfer tubes 14 and supplies the cavity 104 of the casing 58 and subsequently leaves the water outlet 16.

The described water flow system adequately cools all the heated turbine surfaces, and likewise, the pressure-containing metal walls of the combustion chamber, while providing a structure which is readily cleanable and easy to disassemble for inspection. Since there is water flow to the discharge portion of the compressor 53 the metal in said region is adequately cooled to withstand heat of air compression, and at the inlet of the compressor the hot water prevents icing due to temperature drop of expansion of the accelerated air, which enters the compressor at sonic velocity, supplementing the radiant effect of the motor-generator 51.

In a booster unit of 600 horsepower, the blading tip diameter reaches a maximum of four inches, therefore, a rotative speed of approximately 102,000 revolutions per minute is required to provide a correct blading speed, using supersonic compressor blading, to provide a desired pressure ratio of twenty-five to one in the combustion chamber. However, the required speed of the drive shaft is approximately 2500 revolutions per minute, therefore, a system of compounded planet gearing is provided for speed reduction. This gearing is likewise arranged to serve the purpose of automatic connection at either of two speed ratios to the electric motor-generator 51 depending upon the function being served by the latter, whether providing power or generating current. Also, the reduction gearing is arranged to free wheel, or is capable of being entirely declutched when the power booster is not delivering power, by a construction to be later described.

Figures 8, 9:
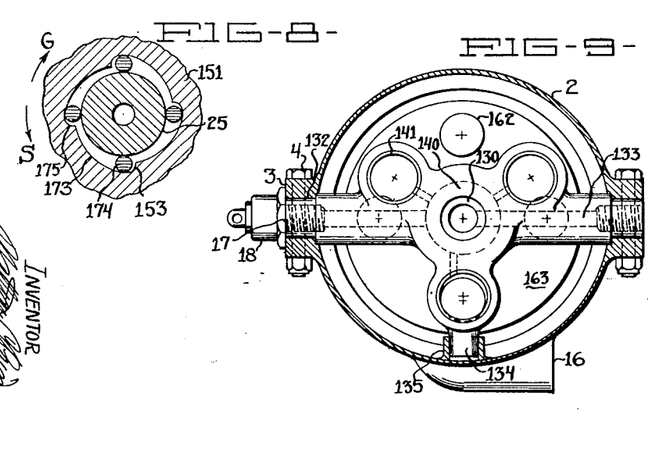
Figure 8 is a section normal to the axis, of an overrunning clutch for the electric starting function of the motor-generator, viewed toward the rear.
Figure 9 is a vertical fragmentary section of the reduction gear supports, viewed transversely to the axis and in a forward direction, with the gears removed.

The support and proper lubrication of the planetary gear system 50 is provided by a pair of axially spaced spiders 130 and 140 located between the bulkhead 47 and a drive shaft ball bearing 131 secured between the casings 2. The spiders 130 and 140 are generally T-shaped, terminating in pairs of horizontal pins 132 clamped in cylindrical, transverse recesses between the casing flanges 3, which pins act as bosses for the lubricating oil inlets 17 and 57 and for a fuel inlet passage 133 as shown in Figures 1, 5, and 9. The spiders 130 and 140 are further aligned by vertical pins 129 and 134 respectively, at the lower extremity, which engage sockets 128 and 135 respectively, extending upward from the bore of the lower half of the casing 2.

Along the axis of the unit 1 the rearward spider 140 contains a stepped bore serving as the journal bearing 26 of the compressor turbine rotor 25, and cooperating with a land 136 of the rotor 25 for absorbing thrust, whereas the forward spider 130 contains a bore 137 at the axis, registering the fuel seal member 31 against the front end of the rotor 25. The seal member 31 is preferably composed of synthetic sapphire and is urged against the rotor 25 by a ring type of spring 138 cooperating with a circumferential groove in the bore 137. An O ring seal 139 of preferably silicon-rubber is provided in a groove of the bore 137 surrounding the member 31 to seal the outside thereof against the bore 137.

Spaced in a circle radially outward from the axis at 120 degree intervals, are three journal bearings 141 formed in the body of the spider 140, whereas, the spider 130 has six such bearings in alignment with the bearing 141, consisting of three main bearings 142 and three outboard bearings 143, the latter being located in a tubular forward extension 144 of the spider 130.

Journalled in the bearings 142 and 143 are three parallel planet shafts 145, each having a spur gear 146 meshing with the pinion 34 of the compressor-turbine rotor 25 in a plane between the spiders 130 and 140. The rear face of each gear 146 is supplied with a toothed jaw 147 of the overrunning clutch type to engage a jaw 148 on each of three stub shafts 149 journalled in the bearings 141 of the spider 140. Adjacent to their rear ends the shafts 149 are furnished with helical spur pinions 150 meshing with a helical gear 151 which is joined by a spline 152 to the front end of the motor-generator shaft 41. The direction of the helix of the pinions 150 is such that the jaws 147 and 148 are in forcible engagement when power is being supplied from the rotor 25 through the described gear train to the motor-generator 51, causing it to generate electricity.

However, when the motor-generator is utilized as a starting motor for the unit 1 the motoring torque is transmitted directly from the shaft 41 through an overrunning clutch 153 in the center of the gear 151 to the compresor-turbine rotor, as will be described in connection with Figure 8. Under the latter circumstances the helix direction of the pinions 150 causes the stub shafts 149 to slide in a rearward direction disengaging the jaws 147 and 148 as shown by the dotted lines X in Figure 5. When the power boost unit has reached a self-sustaining condition, the speed of the compressor-turbine rotor then exceeding that of the motor generator, the jaws 147 and 148 become engaged by the action of a compression spring 154 in a bore 155 at the rear end of the stub shaft 149 forcing the latter axially forward and away from a plug 156 in the bore 155, which presses against the bulkhead 147.

After the attainment of self-sustaining operation of the compressor-turbine, power delivered to the gears 146 is transmitted from spur pinions 157 of the shafts 145 straddled by the bearings 142 and 143, to a sun gear 158 with which these pinions mesh. The torque of the sun gear 158 is delivered along a shaft 159 to a sun gear 160 and then to a plurality of planet gears 161, meshing therewith, and journalled on crankpins 162 of a planetary spider 163 formed at the rear end of the drive shaft 6. The planet gears 161 engage a ring gear 164 journalled in the bore of the casing 2.

Referring to Figures 2 and 5 the method by which the ring gear 164 is utilized as a clutch for the unit 1 is illustrated. A plurality of radial holes 165 are provided in a shoulder 166 of the ring gear 164 into which holes may be engaged, a buttress-shaped nose 168 of an axially slideable pin 167 under the force of a compression spring 169, which reacts between a retainer cap 170, threaded between the flanges 3, and a shoulder 171 of the pin 167.

When the pin 167 is drawn outward by an eye 172 provided for external control, the pin then assuming the position of the dotted lines Y, the ring gear 164 becomes free to rotate in either direction, so that the unit 1 is effectively disconnected from the propeller shaft 5, and can be operated without transmitting power to the propeller shaft.

When the pin 167 is released, the spring 169 tends to force the nose 168 into one of the holes 165 but under certain conditions, inclined flank 176 provided at one side of the nose, permits the ring gear 164 to free wheel in the direction of rotation indicated by the arrow F, resembling a ratchet action.

Therefore, the propeller shaft does not tend to motor the unit 1 unless the pin 167 is forced radially inward by external control, opposing the pin's outward force, such as when it is desired to start the power boost unit without electric current being available to supply the motor-generator, in an emergency condition.

When the rotative speed of the unit 1 is raised to a value at which the ring gear 164 becomes substantially stationary, the pin 167 locks the ring gear 164 if the pin 167 is in released condition, so that the unit 1 may commence to transmit torque to the propeller shaft 5. As the fuel flow to the unit 1 is further increased this torque increases accordingly, with the nose 168 locking the ring gear 164, preventing rotation in the direction P.

In Figure 8 are illustrated the details of the over-running clutch 153 previously mentioned in connection with the starting action of the motor-generator 51 upon the compressor-turbine rotor 25. This clutch may consist of alternate near-tangential cams 173 and radial shoulders 175 at the central bore of the gear 151 operable to either wedge or release a plurality of rollers 174 from the exterior surface of the rotor 25. When the rotor 25 tends to revolve faster than the gear 151 in the direction indicated by the arrow S the rollers 174 abut the relatively abrupt shoulders 175, eliminating radial pressure between the cams and the shaft; and the clutch releases. However, if the relative motion of the rotor 25 tends to be in the direction indicated by the arrow G, with respect to the gear 151, the clutch becomes engaged, due to wedging action of the rollers between the cams and the shaft, connecting the motor-generator shaft rigidly to the compressor-turbine shaft.

A suitable power boost unit for propeller shafts must be capable of producing maximum power within a very few seconds after starting from cold. The unit may be shut off again very suddenly after full power has been produced for a protracted period of time. Most of the operation of the power boost unit is characterized by applied extremes of temperature and load. When suddenly stopped after hard running, the upper portion of internal casings and parts remains hot while the lower portions tend to cool rapidly. Therefore, it is necessary for these internal parts to be capable of free expansion differentially, that is differing between upper portions and lower portions. Otherwise the main casing and the internal components will become warped and bowed, resulting in damage to the working parts upon subsequent operation. When full power is applied directly after a cold start, the central portions of the power boost unit become heated far more rapidly than the outermost portions. The above and other actual conditions of thermal expansion are permitted without damage to parts, and without leakage of cooling water from joints, in using the constructions of the present invention. These thermal conditions particularly concern the method of cooling the heated parts, of sealing liquid containing joints, and of supporting together the compressor-turbine rotor and its associated compressor casing, turbine casing, auxiliaries, and reduction gearset spiders, within the main casing.

In the foregoing specification water has been referred to as the cooling medium for the compressor-turbine, although in certain types of installations it may be preferable to utilize other stable liquids having a high rate of heat conductivity, therefore, I desire to emphasize the fact that many modifications of the power boost unit may be resorted to in a manner limited only by a just interpretation of the following claims.

I claim:

1. A gas turbine power unit comprising a relatively long tubular casing containing a unitary compressor-turbine rotor of the axial flow type extending along the axis of said casing, components supported in tandem within said casing in the order named including a speed reduction gearset, an electric generator, a compressor stator vane assembly, an annular combustion space, and a turbine stator vane assembly, and each of said components encompassing said rotor to react therewith.

2. A gas turbine power unit comprising an elongated tubular casing containing a unitary compressor-turbine rotor of the axial flow type extending along the axis of said casing and journalled at one end, a drive pinion furnished on said rotor adjacent to said journalled end, an electric generator having an axial bore at its center of rotation through which said rotor extends, said rotor being cantilevered at a region beyond said generator opposite said journalled end, a compressor stator vane assembly and a turbine stator vane assembly secured in said casing surrounding said cantilevered region of said rotor to react therewith, a speed reduction gearset meshing with said pinion, and said generator being operatively connected to said gearset.

3. Apparatus as defined in claim 2, wherein said generator is operatively connected to said gearset through a first over-running clutch to drive said generator normally at a reduced speed from said rotor, and said rotor being operatively connected to said generator through a second over-running clutch whereby said generator may drive said rotor directly if said generator's speed tends to exceed the speed of said rotor.

4. Apparatus as defined in claim 2, wherein said gearset is of the planetary type including at least one planet gear operatively connected to said pinion and to a ring gear directly journalled for rotation in the bore of said casing, and a variable clutch jaw being provided between said casing and said ring gear selectively operable to secure said ring gear to said casing without rotation.

5. In combination in a turbine power unit, a tubular outer casing containing an elongated turbine rotor of the axial flow type extending along the axis of said casing, a journal bearing secured in said casing and supporting said rotor, said rotor having a cantilevered portion extending beyond said bearing, a spool-shaped inner casing furnished with stator blades to react with said rotor and surrounding said cantilevered portion, said inner casing and said outer casing defining a generally annular cavity for containing a cooling fluid, a bumper ring furnished in relatively close surrounding relationship to said cantilevered portion, at least one hollow strut extending from said inner casing to said ring, and the interior of said strut communicating with said cavity to bring cooling fluid in heat absorbing contact with said ring.

6. A gas turbine power unit comprising an outer tubular casing containing a unitary compressor-turbine rotor of the axial flow type extending along the axis of said casing, a first journal bearing supporting said rotor adjacent to one end thereof, a second journal bearing supporting said rotor adjacent to the middle thereof, an electric generator in said casing located between said bearings, said generator having an electrical rotor journalled in said casing, the portion of said compressor-turbine rotor lying between said bearings being of relatively small diameter, said portion being relatively closely encompassed by a bore along the axis of said electrical rotor, there being a supply of lubricant to flow along the space between said compressor-turbine rotor and said bore, spool-shaped compressor and turbine inner casings secured in said outer casing and surrounding the unsupported portion of said rotor, and said inner casings being furnished with stator vanes to react with said compressor-turbine rotor.

7. Apparatus as defined in claim 6, wherein said outer casing is furnished with a relatively large number of perforations of relatively small size adjacent to said electrical generator and said compressor inner casing for admission of air to said compressor-turbine rotor.

8. A gas turbine power unit for driving a propeller shaft including a single elongated tubular casing of uniform diameter containing a unitary compressor-turbine rotor extending along the axis of said casing, said casing being composed of transversely separable halves, said casing containing an electric motor-generator and transmission gearing connected to said rotor in power exchanging relationship, said motor-generator having an electrical stator member, said transmission gearing being journalled in a bearing stator member, compressor and turbine countervane stator members within said casing to react with said rotor and encompassing said rotor, and all of said stator members being aligned and secured simultaneously by said halves being held forcibly together in a transverse direction and being releasable simultaneously when said halves are separated.

9. In combination in a turbine power unit, a tubular outer casing containing an elongated turbine rotor of the axial flow type extending along the axis of said casing, a spool-shaped inner casing furnished with stator blades surrounding said rotor to react therewith, said inner casing and said outer casing defining an annular cavity for containing coolant, a hollow conoidal body confronting the exhaust gas discharge end of said rotor, at least one streamlined hollow strut extending across the exhaust gas stream between said body and said inner casing and being integral therewith, the interior of said strut forming a communication for radial flow of coolant between said cavity and the interior of said body, and fluid coolant passages extending radially in said rotor and communicating with the interior of said body to cause circulation of cooling fluid through said rotor by centrifugal force.

10. In combination in a gas turbine power unit, a tubular outer casing containing an elongated turbine rotor of the axial flow type extending along the axis of said casing, a journal bearing secured in said casing and supporting said rotor at the gas inlet end thereof, said rotor being unsupported at the exhaust gas discharge end thereof, a spool-shaped inner casing secured in said outer casing and defining a generally annular cavity therewith for containing a cooling fluid, a conoidal body confronting said exhaust gas discharge end of said rotor, at least one streamlined strut extending radially across the exhaust gas stream between said inner casing and said body and being integral therewith, a cylindrical bore located in said body along the axis of said rotor, an axially slideable sleeve in said bore, the interior of said sleeve communicating with the interior of said body, sealing means between said sleeve and said bore to prevent leakage of coolant into the exhaust gas stream, a compression spring in said bore arranged to urge said sleeve against said rotor's end to form a leakproof juncture therewith, coolant circulation passages in said rotor opening into the interior of said sleeve, and a duct extending from said cavity through said strut to the interior of said body.

11. In combination in a gas turbine power unit, a tubular outer casing containing a unitary compressor-turbine rotor extending along the axis of said casing, said rotor being journalled in said casing principally at one end of said rotor, the unsupported portion of said rotor being furnished with compressor blading and with turbine blading spaced apart, said outer casing having an elongated bore of uniform diameter, a spool-shaped compressor inner casing furnished with blading to react with said rotor and surrounding said compressor blading, a spool-shaped turbine inner casing furnished with blading to react with said rotor and surrounding said turbine blading, each of said inner casings cooperating with said bore to define a generally annular cavity for a cooling fluid, a refractory liner for combustion substantially covering said outer casing's bore between the ends of said compressor and said turbine inner casings and spaced apart axially therefrom to permit expansion, said liner being composed of a plurality of cylindrically curved segments to permit tangential expansion, and a shoulder on each of said inner casings overlapping said segments to hold said segments against said bore.

12. Apparatus as defined in claim 11, wherein said outer casing is furnished with a plurality of longitudinal passages of tubular form connecting each of said cavities to the other for circulation of cooling fluid therebetwixt, said passages being in heat absorbing relationship with the portion of said outer casing surrounding said refractory liner, and said passages being spaced apart tangentially to permit tangential expansion of said outer casing.

13. In combination in a gas turbine power unit, a tubular outer casing having a relatively long bore of uniform diameter, said bore containing an elongated turbine-compressor rotor of the axial flow type extending along the axis of said casing, said rotor having compressor and turbine blading attached thereto, a first spool-shaped inner casing furnished with compressor stator blades surrounding said rotor to react therewith, a second spool-shaped inner casing furnished with turbine stator blades surrounding said rotor to react therewith, and each of said inner casings being aligned with the other of said inner casings by said bore and defining a generally annular cavity with said bore for containing a cooling fluid, and wherein said inner and said outer casings are each composed of transversely separable halves having congruent longitudinal parting planes, and a pin extending through each of said inner casings and said outer casing to lock said inner casings to said outer casing, each of said inner casing halves being secured at only one plane transverse to said axis whereby each of said halves may expand independently of the opposite half.

14. A gas turbine power unit comprising a relatively long tubular casing containing a unitary compressor-turbine rotor extending along the axis of said casing, stator members reacting with said rotor and contained within said casing including a compressor vane stator, a turbine vane stator, and a rotor bearing support member, each of said stator members being furnished with radially projecting pins, said casing being composed of transversely separable halves along substantially the entire length of said casing, each of said halves having longitudinal flanges confronting the flanges of the opposite half, means for securing said flanges together, radial bores in said flanges compressing said pins, the axes of said bores lying in the parting plane of said flanges, and all of said stator members being aligned with said rotor by said casing halves being pressed together.

NATHAN C. PRICE.

(References on following page)

REFERENCES CITED

The following references are of record in the file of this patent:

UNITED STATES PATENTS

| Number | Name | Date |
|---|---|---|
| 525,390 | McElroy | Sept. 4, 1894 |
| 777,865 | Stumpf | Dec. 20, 1904 |
| 892,206 | Apple | June 30, 1908 |
| 1,139,696 | Maxwell | May 18, 1915 |
| 1,164,091 | Herz | Dec. 14, 1915 |
| 1,180,792 | Norrman | Apr. 25, 1916 |
| 1,418,444 | Josephs | June 6, 1922 |
| 1,638,944 | Ljungstrom | Aug. 16, 1927 |
| 1,938,688 | Brooke | Dec. 12, 1933 |
| 1,960,810 | Gordon | May 29, 1934 |
| 1,981,618 | Faverty | Nov. 20, 1934 |
| 2,172,910 | Keller | Sept. 12, 1939 |
| 2,180,168 | Puffer | Nov. 14, 1939 |
| 2,193,114 | Seippel | Mar. 12, 1940 |
| 2,339,185 | Nettel | Jan. 11, 1944 |
| 2,358,301 | Brauns | Sept. 19, 1944 |
| 2,360,130 | Heppner | Oct. 10, 1944 |
| 2,434,901 | Buck et al. | Jan. 27, 1948 |
| 2,452,581 | Lehmann | Nov. 2, 1948 |
| 2,468,461 | Price | Apr. 26, 1949 |
| 2,472,924 | Schwendner | June 14, 1949 |
| 2,485,813 | Carlson | Oct. 25, 1949 |

FOREIGN PATENTS

| Number | Country | Date |
|---|---|---|
| 1,973 | Great Britain | Jan. 24, 1914 |